ns. In one aspect it relates to the separation of normal butane from butenes and butylene. Another aspect of the invention is its application to the separation of hydrocarbons following treatment for the dehydrogenation of $C_4$ hydrocarbons, such as normal butane, to form unsaturated hydrocarbons including butenes, and butadiene.

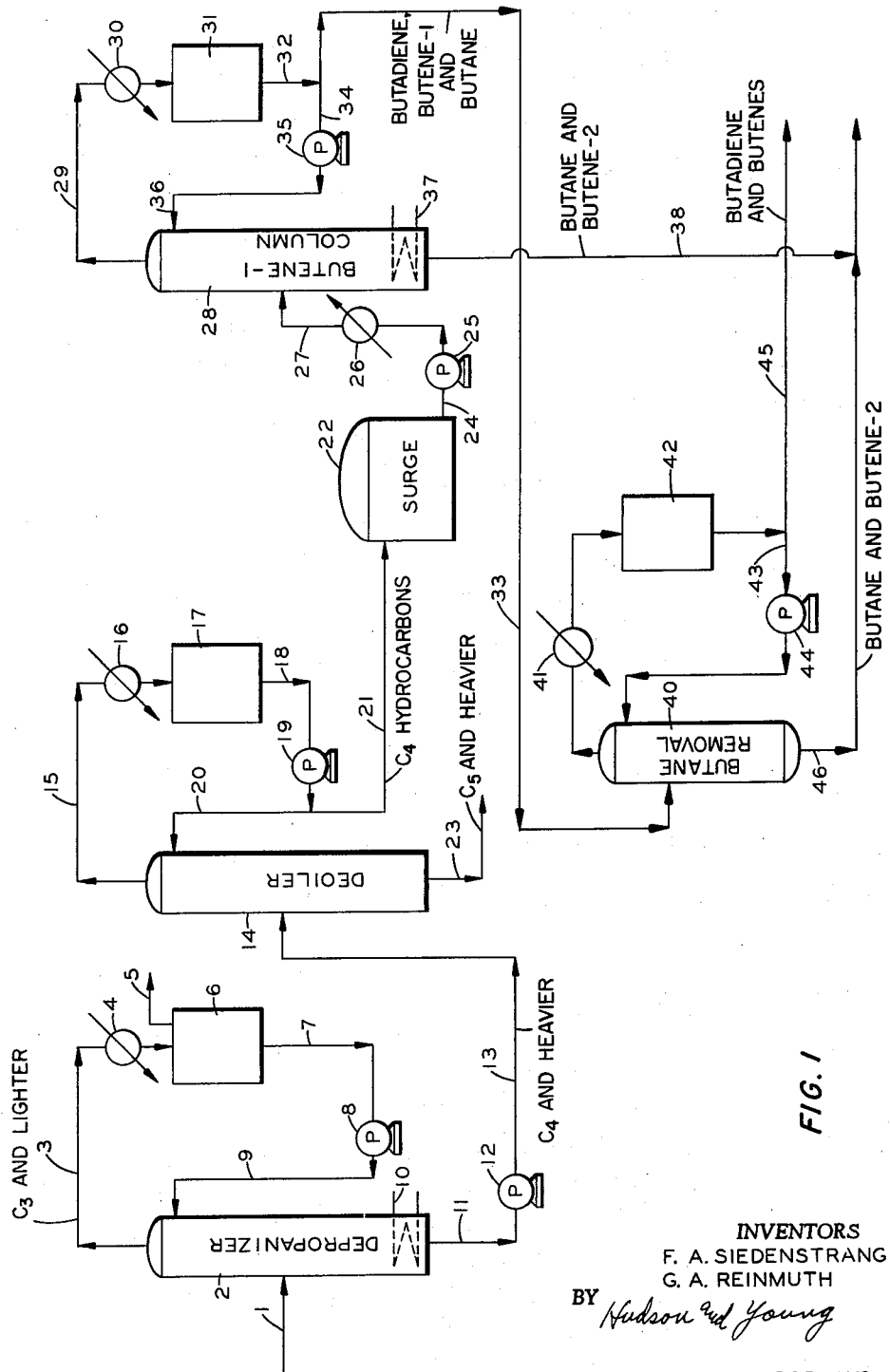

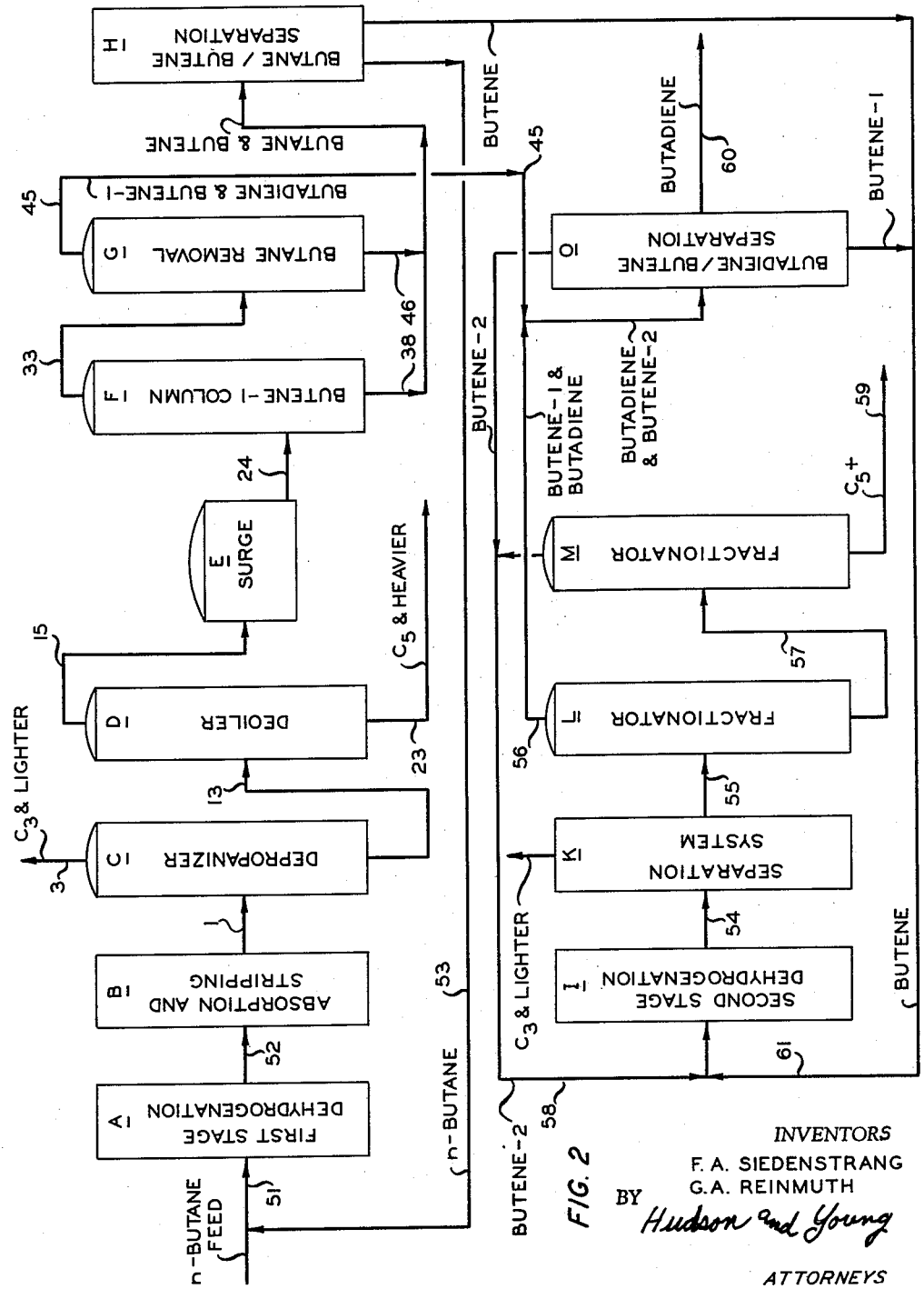

United States Patent Office 3,004,083
Patented Oct. 10, 1961

3,004,083
HYDROCARBON SEPARATION
Fred A. Siedenstrang and Gene K. Reinmuth, Borger, Tex., assignors to Phillips Petroleum Company, a corporation of Delaware
Filed Feb. 14, 1958, Ser. No. 715,359
3 Claims. (Cl. 260—680)

This invention relates to the separation of hydrocarbons. In one aspect it relates to the separation of normal butane from butenes and butylene. Another aspect of the invention is its application to the separation of hydrocarbons following treatment for the dehydrogenation of $C_4$ hydrocarbons, such as normal butane, to form unsaturated hydrocarbons including butenes, and butadiene.

The dehydrogenation of hydrocarbons produces complex mixtures of hydrocarbons. Thus the dehydrogenation of paraffin hydrocarbons produces a mixture of olefins, diolefins and paraffin hydrocarbons. It is of course necessary to resolve these mixtures into their various components in order to utilize such components. Thus, the diolefins are valuable for the preparation of synthetic rubber, olefins are valuable for production of polymers and also for the production of diolefins, and paraffins are valuable for the production of both olefins and diolefins as well as for other uses. Efficient fractional distillation of such complex hydrocarbon mixtures ordinarily requires a great number of distillation steps and also requires some very close fractional distillation procedures in order to segregate the individual components which go to make up the mixture. It is common practice to use absorption procedures in connection with the fractional distillation procedures in segregating the components which make up the above-referred to hydrocarbon mixtures. In one process for the production of synthetic rubber normal butane is catalytically dehydrogenated to form a mixture of unsaturated hydrocarbons in combination with unreacted normal butane and this mixture is resolved to recover butadiene which has been formed in the dehydrogenation process and also to separate and recover butenes which have resulted from the dehydrogenation step.

It is an object of the present invention to provide an improved process for resolving the product of the dehydrogenation of normal butane into its various components. It is also an object of the present invention to provide a method for recovering butadiene from a mixture containing butadiene together with normal butane without the necessity of breaking the butadiene-normal butane azeotrope which is formed during such distillation. Other objects and advantages will become apparent to one skilled in the art upon reading the disclosure of the present invention including the drawing.

FIGURE 1 is a schematic flow sheet of one embodiment of the invention; and

FIGURE 2 is a schematic flow sheet of a process for the production of butadiene from normal butane wherein an embodiment of the invention is incorporated.

Referring now to FIGURE 1 of the drawing, the feed material introduced via conduit 1 to depropanizer 2, is the effluent from the catalytic dehydrogenation of normal butane followed by an adsorption step and a stripping step, as illustrated in FIGURE 2. The feed material in conduit 1 comprises n-butane, isobutane, butene-1, butene-2, isobutylene, butadiene-1,3, propane, propylene, and a $C_5$ and heavier fraction containing both saturated and unsaturated hydrocarbons. $C_3$ and lighter components are taken overhead from depropanizer 2 via conduit 3 through cooler 4 to accumulator 6 where uncondensed vapors are removed via conduit 5 and condensed liquids are removed from accumulator 6 via conduit 7, pump 8 and returned to depropanizer 2 as reflux via conduit 9. A liquid stream can be recovered from accumulator 6 as liquefied petroleum gas. Bottoms products comprising $C_4$ and heavier hydrocarbons are removed from the bottom of depropanizer 2 via conduit 11, pump 12, and conduit 13 and are introduced to de-oiler 14. $C_5$ and heavier hydrocarbons are removed from the bottom of de-oiler 14 via conduit 23. The overhead materials from de-oiler 14 comprising substantially $C_4$ hydrocarbons, are removed via conduit 15, cooler 16 to accumulator 17 where all of the overhead products are accumulated and passed via conduit 18 to pump 19 where the stream is divided, a portion being returned to de-oiler 14 as reflux via conduit 20 and the remaining portion being passed via conduit 21 to surge 22. A controlled amount of liquid material is removed from surge 22 via conduit 24 and pump 25, is heated in heater 26 and is passed via conduit 27 to butene-1 column 28. The overhead material from buene-1 column 28 is passed through conduit 29, cooler 30 to accumulator 31 where all of the matereial is accumulated and is passed out via conduit 32 where the stream is divided, a portion of which is removed via conduit 33 and the remaining portion is passed through conduit 34, pump 35 and conduit 36 to be returned to butene-1 column 28 as reflux. Heat is added to butene-1 column 28 by means of heater 37 and the kettle product from the column is removed via conduit 38.

The overhead product from butene-1 column 28 is passed via conduit 33 to butane removal column 40. The overhead product is cooled and totally condensed in cooler 41, collected in accumulator 42, from whence a portion is passed via conduit 43 and pump 44 to column 40 as reflux. The remaining portion is passed via conduit 45 to an extractive distillation process for separation of butenes and butadiene. The kettle product is passed via conduit 46 and joined with the kettle product from butene-1 column in conduit 38 and passed to a second extractive distillation process for separation of butane from butenes.

Referring now to FIGURE 2, normal butane is passed via conduit 51 to first stage dehydrogenation zone A. The reaction products pass via conduit 52 to absorption and stripping zone B where some $C_3$ and lighter materials are removed. The remaining materials then pass via conduit 1 to depropanizer C (2 of FIGURE 1) where the remaining $C_3$ and lighter materials are removed overhead via conduit 3 and the kettle product is passed to the deoiler D (14 of FIGURE 1) via conduit 13. $C_5$ and heavier materials are removed from D via conduit 23 and $C_4$ hydrocarbons pass via conduit 15 to surge E. Material from surge E passes via conduit 24 to butene-1 column F (28 of FIGURE 1) where a butene-rich stream is taken overhead and is passed via conduit 33 to butane removal column G (40 of FIGURE 1). The overhead from G is passed via conduit 45 to butene-butadiene separation zone O. The kettle products from F and G are passed via conduits 38 and 46 to butane-butene separation zone H. Butane from H is passed via conduit 53 to A. Butene-2 is dehydrogenated to butadiene in zone I, passed to separation system K via conduit 54 where $C_3$ and lighter materials are removed and then to fractionator L via conduit 55 where the butadiene and butene are passed via conduits 56 and 45 to separation zone O. The kettle products are removed via 57 and passed to fractionator M where $C_5$ and heavier materials are removed as kettle product via conduit 59. Butene-2 is removed overhead from M and passed via conduit 58 to I. Butadiene product is removed from O via conduit 60 and butenes are passed from O to I via conduits 61 and 58.

In one process for the dehydration of butane to form butene and butadiene the effluent from the dehydrogenation step was passed through a lean oil absorber and stripper to separate a portion of the $C_3$'s and lower boiling hydrocarbons. The effluent from the absorber and stripper was then passed into a depropanizer to remove the remainder of the $C_3$ hydrocarbons, and the kettle product from the depropanizer was then passed into a surge tank. A carefully controlled stream of hydrocarbons was then passed from the surge tank into the butene-1 column wherein butene-1 was taken overhead and butene-2 was removed as kettle product. The kettle product from the butene-1 column comprising butene-2 and heavier hydrocarbons was passed into a de-oiler wherein $C_5$ hydrocarbons and heavier were removed. The overhead from the de-oiler was passed into an extractive distillation process. When operating by this method, it was necessary to cool the depropanizer kettle product before passing it into the surge tank, since the kettle product has a very high vapor pressure and expensive tanks would be required to hold this material if it were not cooled. It was necessary to pass the carefully controlled stream of feed into the butene-1 column since a rather difficult separation is made in this column. The kettle product from the butene-1 column can be passed directly into a de-oiler, since the rate of flow of feed into the de-oiler does not have to be carefully controlled because a relatively rough separation is made. Thus when operating according to this prior art method it can be seen that it was necessary to cool the depropanizer kettle product for storage and then to heat this material so as to provide a considerable amount of heat for the separation in the butene-1 column.

In another prior art method of separating the effluent of a normal butane dehydrogenation process into its various components the effluent from the absorber and stripper was passed to the butene-1 column to remove butene-1, butadiene and lighter products overhead and this overhead stream was then passed to the depropanizer. The butene-1 column kettle product, containing n-butane, butene-2 and heavier hydrocarbons was passed to a de-oiler and $C_5$ and heavier products were removed as bottom products from the de-oiler and the overhead product was then passed to an extractive distillation column for separation of n-butane from butene-2. The kettle product from the depropanizer, containing butene-1, butadiene and some n-butane was passed to an extractive distillation step for recovery of butadiene as product and recovery of butene-1 for dehydrogenation in the second stage dehydrogenation step. This method of operation is illustrated and described in U.S. Patent 2,750,435, issued June 12, 1956 to John Fetchin.

When operating according to the last-named prior art method three butene-1 columns were used to provide the capacity required by one de-oiler and one depropanizer and an undesirable amount of normal butane was being passed to the butene dehydrogenation step. When operating according to the improved method of the present invention only two butene-1 columns are required and the extra column is used as the butane removal column 40 so that the amount of butane passed to the butene dehydrogenation step is reduced from about 4.5 percent to about 1 percent. The overhead product from the butene-1 column is passed to the butane removal column where butane, and some butenes, are removed as kettle products and the overhead product is passed to an extractive distillation step for separation of butadiene from butylene.

In accordance with the present invention, the effluent from the absorber and stripper is passed into a depropanizer and the kettle product from the depropanizer is passed directly into the de-oiler. This results in a savings in cooling water and a saving in heat since it is not necessary either to cool or to heat the depropanizer kettle product before being passed to the de-oiler. The overhead from the de-oiler is then passed to the butene-1 column and it is necessary to condense and cool the overhead of the de-oiler; however, the volume of the feed to the butene-1 column has been decreased and a surge tank can be used in this step which is considerably smaller than in the prior art method and furthermore does not have to stand excessive pressure since $C_3$ and lighter materials have been removed. A carefully controlled rate of flow of fluid from the surge tank is then passed into the butene-1 column. The overhead product from the butene-1 column is passed to the butane removal column where butane and some butenes are removed as kettle product and the overhead product, comprising substantially butadiene and butenes, is passed to an extractive distillation process for separation of butadiene from butenes. The kettle product from the butene-1 column and the kettle product from the butane removal column are passed to an absorption unit where normal butane is separated from butene-2, the normal butane being returned to the first dehydrogenation step and the butene-2 being passed to the second dehydrogenation step for dehydrogenation to butadiene.

We have found that a number of advantages result from the present method of operation and these advantages include an increase in the amount of liquefied petroleum gas products which can be recovered from the overhead of the depropanizer as a result of adequate depropanizer capacity; lower operating pressure on the butene-1 column which tends to reduce fouling in this column and provides a better separation; increased recovery of butadiene; a substantial reduction in the amount of normal butane which is passed to the second dehydrogenation step; and increase in capacity of the system.

The following specific embodiment of the invention will aid in an understanding of the invention but is not to be construed as limiting the invention.

EXAMPLE

During operation of the separation system of my invention a stream analysis was made and the results are shown in Table I.

*Table I*

| Stream Number | 1 | 13 | 33 | 38 | 45 | 46 |
|---|---|---|---|---|---|---|
| Component | Mol Percent | Mol Percent | Mol Percent | Mol Percent | Mol Percent | Mol Percent |
| Propane | 4.5 | 0.6 | 3.2 | | 8.2 | |
| Butadiene | 2.7 | 2.8 | 12.1 | 0.2 | 25.0 | 0.3 |
| Isobutylene | | | 3.3 | | 66.3 | 0.2 |
| Butene-1 | 10.0 | 10.6 | 26.9 | 5.7 | | 0.5 |
| Butene-2 | 16.8 | 17.6 | 7.2 | 20.9 | 0.4 | 15.0 |
| Isobutane | 0.1 | 0.1 | 0.5 | | | 0.4 |
| Normal Butane | 65.9 | 68.3 | 46.8 | 73.2 | 1.1 | 83.4 |

A typical stream analysis taken on the same system operated according to the prior art disclosed the stream corresponding to stream 1 of Table I to be composed of propane, 4.2%; butadiene, 2.2%; isobutylene, 0.2%; butene-1, 9.1%; butene-2, 15.3%; isobutane, 0.3%; and normal butane, 68.7%. This stream was the feed to the butene-1 column or butene splitter. The depropanizer kettle product of the prior art method of operation corresponded to the butane remover overhead product of the present system and was composed of propane, 0.8%; butadiene, 21.1%; isobutylene, 0.8%; butene-1, 27.2%; butene-2, 44.3%; isobutane, 1.3%; and normal butane, 4.5%.

Comparison of the two methods shows that more butadiene and less normal butane is present in the stream passing to the second stage dehydrogenation step when operating according to the method of the invention. The reduction in the amount of normal butane passing to the second stage dehydrogenation step is of particular importance because the normal butane must be maintained as low as possible in the second stage dehydrogenation step.

The amount of L.P. gas recovered from the depropanizer was about doubled as a result of the present method of operation and the total material passed through the system was increased about 12 percent.

Variations and modifications are possible within the scope of the present disclosure without departing from the spirit and scope of the invention.

That which is claimed is:

1. In the process wherein normal butane is dehydrogenated to form olefins and diolefins, $C_3$ and lighter materials are removed from the dehydrogenation effluent, the butadiene is recovered and the olefins and remaining normal butane are separated and passed to respective dehydrogenation steps, the improvement comprising passing the butane dehydrogenation effluent, from which $C_3$ and lighter hydrocarbons have been removed, and without further treatment, to a fractional distillation de-oiling step so as to remove $C_5$ and heavier hydrocarbons as the kettle product; cooling and passing the overhead product from the de-oiling step to a surge storage zone; passing a stream of hydrocarbon, without further treatment, from said surge storage to a fractional distillation butene splitter step so as to remove butene-1, isobutylene, butadiene and some butane overhead and butene-2 and normal butane as kettle product; removing butane and butene-2 from the butene splitter overhead; separating butane and butene-2; returning normal butane to the first stated dehydrogenation step; recovering butadiene from admixture with butenes and passing said butenes to a second dehydrogenation step.

2. A process for separating normal butane from admixture with olefins comprising isobutylene, butene-1, and butene-2, in a hydrocarbon mixture comprising $C_3$ and lighter hydrocarbons, $C_4$ hydrocarbons, and $C_5$ and heavier hydrocarbons contained in the effluent from a normal butane dehydrogenation step which comprises subjecting the normal butane dehydrogenation effluent to a first fractional distillation step to remove $C_3$ and lighter hydrocarbons overhead; passing the kettle product from the first distillation step directly to a second fractional distillation step to remove $C_5$ and heavier hydrocarbons as kettle product; passing the overhead product from the second fractional distillation step to a surge zone and then without further treatment to a third fractional distillation step to remove butene-1, isobutylene and some butane overhead and to remove butene-2 and normal butane as kettle product; recovering the overhead product from the third distillation step as an olefinic product of the process; passing the kettle product without further treatment to an absorption step to absorb butene-2; recovering normal butane as a paraffinic product of the process; and recovering butene-2 from said absorption step as additional olefinic product of the process.

3. A process for the manufacture of butadiene which comprises subjecting normal butane to a first dehydrogenation step; subjecting the effluent from said first dehydrogenation step to a first fractional distillation step to remove $C_3$ and lighter materials as an overhead product; subjecting remaining hydrocarbons without further treatment to a second fractional distillation step to remove $C_5$ and heavier hydrocarbons as a kettle product; passing the remaining hydrocarbons to a surge zone and then without further treatment to a third fractional distillation step to remove an overhead product comprising butene-1, isobutylene, butadiene and normal butane and a kettle product comprising butene-2 and normal butane; passing the overhead product from the third fractional distillation step, without further treatment, to a fourth fractional distillation step to remove normal butane as kettle product; passing the overhead from said fourth distillation, without further treatment, to a step for recovery of butadiene; passing remaining butene-1 and isobutylene to a second dehydrogenation step to produce additional butadiene; passing the kettle product from the third fractional distillation, without further treatment, to a step for separating normal butane from butene-2; passing butene-2 to said dehydrogenation step; and returning normal butane from said third and fourth distillation to said first dehydrogenation step.

References Cited in the file of this patent

UNITED STATES PATENTS

| | | |
|---|---|---|
| 2,386,310 | Hachmuth | Oct. 9, 1945 |
| 2,395,016 | Schulze et al. | Feb. 19, 1946 |
| 2,750,435 | Fetchin | June 12, 1956 |
| 2,850,550 | Reinmuth | Sept. 2, 1958 |

UNITED STATES PATENT OFFICE
CERTIFICATE OF CORRECTION

Patent No. 3,004,083  
October 10, 1961

Fred A. Siedenstrang et al.

It is hereby certified that error appears in the above numbered patent requiring correction and that the said Letters Patent should read as corrected below.

Column 6, line 31, after "said" insert -- second --.

Signed and sealed this 3rd day of April 1962.

(SEAL)  
Attest:

ERNEST W. SWIDER  
Attesting Officer

DAVID L. LADD  
Commissioner of Paten